United States Patent [19]

Sanders

[11] 4,267,222
[45] May 12, 1981

[54] COMPOSITE PANEL AND PROCESS OF ITS MANUFACTURE

[76] Inventor: Eugene D. Sanders, 624 Birge, Dumas, Tex. 79029

[21] Appl. No.: 915,545

[22] Filed: Jun. 14, 1978

Related U.S. Application Data

[63] Continuation of Ser. No. 714,856, Aug. 16, 1976, abandoned.

[51] Int. Cl.³ .............................................. B32B 5/16
[52] U.S. Cl. ................................ 428/150; 52/309.14; 52/DIG. 7; 52/309.13; 428/228; 428/285; 428/331
[58] Field of Search ............... 428/306, 308, 328, 331, 428/316, 323, 143, 402, 148, 149, 228, 205; 52/309.13, DIG. 7, 309.14, 309.15; 264/112, 113, 120, 109, 128

[56] References Cited

U.S. PATENT DOCUMENTS

| | | | |
|---|---|---|---|
| 2,577,214 | 12/1951 | Slayter | 428/228 |
| 2,806,509 | 9/1957 | Bozzucco et al. | 264/109 |
| 2,975,488 | 3/1961 | Brunner | 264/109 |
| 3,144,346 | 8/1964 | Dilnot | 264/128 |
| 3,256,374 | 6/1966 | Suzuki | 264/109 |
| 3,324,213 | 6/1967 | Anfinset | 264/71 |
| 3,328,231 | 6/1967 | Sergovic | 52/DIG. 7 |
| 3,419,454 | 12/1968 | Hoffman | 428/150 |
| 3,679,539 | 7/1972 | Gossens et al. | 260/37 EP |
| 3,745,052 | 7/1973 | Higgins | 428/143 |
| 3,830,776 | 8/1974 | Carlson et al. | 260/37 EP |
| 3,917,547 | 11/1975 | Massey | 428/308 |
| 3,958,063 | 5/1976 | Robson | 428/148 |

FOREIGN PATENT DOCUMENTS

| | | | |
|---|---|---|---|
| 1930198 | 12/1970 | Fed. Rep. of Germany | 428/402 |
| 2331306 | 1/1975 | Fed. Rep. of Germany | 464/109 |
| 2334184 | 1/1975 | Fed. Rep. of Germany | 428/323 |
| 1170363 | 11/1969 | United Kingdom | 428/143 |

OTHER PUBLICATIONS

Journal of the American Concrete Institute, Apr. 1949 pp. 582–586.

Primary Examiner—Stanley S. Silverman
Attorney, Agent, or Firm—Munson H. Lane; Munson H. Lane, Jr.

[57] ABSTRACT

A building panel comprising, when completed, a substantially rigid polyester resin building mass in sheet form having molded therein a plurality of closely compacted porous scoria rock particles of varied size in range of ¼ to 1¼ inch diameter size and each comprising vesicules of varied size in range of 0.1 to 0.5 millimeters diameter that occupy the major portion of the volume of each such particle, such particles being compacted to form a substantially incompressible mass, said polyester resin being of substantial tensile strength and extending between the rock particles and including fingerlike intrusions extending into the larger vesicules of the rock particles and holding the rock particles together, said compacted rock particles substantially filling the entire volume of the polyester resinous mass, and including portions extending beyond the volume occupied by such polyester resin mass.

10 Claims, 10 Drawing Figures

COMPOSITE PANEL AND PROCESS OF ITS MANUFACTURE

This is a continuation of application Ser. No. 714,856, filed Aug. 16, 1976, now abandoned.

BACKGROUND OF THE INVENTION

1. The Field of the Invention

The field of the invention to which this invention pertains is structural elements, stone-like, incorporating particulate material.

2. Description of the Prior Art

The prior art of building panels has not provided a combination of strength, hardness and wear-resistance of concrete which also provides resistance to water action and light weight to provide the ready handling by normally available labor for rapid installation thereof. Concurrently, plastic panels have been plagued by weathering due to exposure to sunlight and have not been particularly temperature resistant and are readily scratched so that their surfaces are damaged by usual dust in the atmosphere and blown against the building surfaces by wind. Metal surfaces have been prone to corrosion and poor insulating characteristics.

The present invention provides a building structure which has the strength and hardness of concrete products and concurrent surface wear characteristics; however, this panel is tougher and more elastic than concrete products as well as being waterproof and is sufficiently light that it may be readily manipulated by a single operator for installation in a building.

SUMMARY OF THE INVENTION

Rigid hard porous particles of varied size predominantly larger than ¼ inch diameter size and each comprising vesicles of varied size that occupy the major portion of the volume of each such particle are located with a sufficiently dense packing to form a substantially incompressible mass. A resinous mass of substantial tensile strength substantially fills the voids between such particles and provides fingerlike intrusion into the larger vesicle of the particle whereby to hold those particles together; such holding force is enhanced by the shrinking action of such resin on its solidification, which action provides a particularly strong connection between the solid porous particles.

The relative volume of particles and resin used is arranged so that the particles extend beyond the boundaries of the resin and provide a hard, heat and radiation resistant shield that protects the resin therebelow. The small vesicles of the particles provide insulation action. The composite structure has great strength, hardness, toughness, and is made in form of light yet strong hard-surfaced panels that are readily and rapidly handled and installed.

A reliable apparatus and process for manufacture of such panels is also provided.

BRIEF DESCRIPTION OF THE DRAWINGS

FIGS. 3-6 are shown to scale.

FIG. 4 is a view of the exterior panel surface taken in the direction of arrow 4A of FIG. 2 to show a portion thereof, (19), in a zone as 4B of FIG. 1 to illustrate the textural and the detailed structural characteristics of the surface and a ruler is provided therewith graduated in inches to demonstrate the size of the components thereof.

FIG. 5 is a transverse sectional view of the representative portion 19 as shown in FIG. 4; this sectional view includes a ruler graduated in inches to illustrate the size of components shown in this figure; this view is taken along direction of arrow 5A of FIG. 4.

FIG. 6 is an enlarged macrophotograph of zone 6A of FIG. 5 to show details of the structure thereof; this macrophotograph as filed with this application provides an approximately 5× magnification of full size of the structure shown. Dimensions of components shown in this photograph may be closely approximated (i.e., to ±2%) from the scale of distance 45 also shown in this figure. FIG. 3 is a diagrammatic representation of structures shown in this photograph.

FIGS. 7, 8, and 9 are diagrammatic vertical section views along plane 7A of FIG. 10 as views along direction of arrow 7B.

FIG. 9 is a diagrammatic view partially in vertical sections along plane 7A and partially a side view along direction of arrow 9A of FIG. 10.

DESCRIPTION OF THE PREFERRED EMBODIMENT

Figure 1:
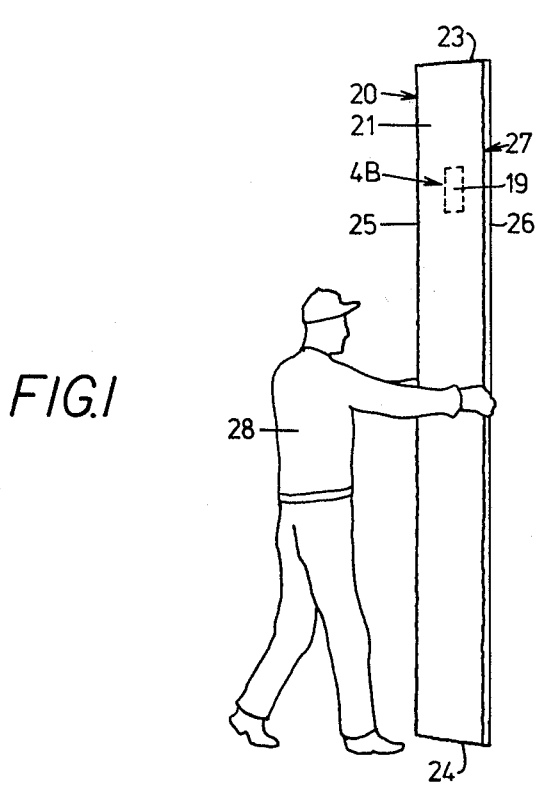
FIG. 1 is a diagrammatic showing of an operator installing and handling a panel made according to this invention.

The panel 20 according to this invention as shown in FIG. 1 is formed of a body mass 27 having an outer face 21, an inner surface 22, a top edge 23, a bottom edge 24, a left edge 25, and a right edge 26. This panel may be readily handled by an adult of average strength and size as operator 28. The structure of the body mass 27 between the inner face 22 and the outer face 21 is shown in some detail in FIGS. 3 through 6.

The body mass 27 of the panel 20 is formed of a resin mass 30 interspersed and cooperating with a plurality of porous rocks as 32-43 and a fiberglass backing layer 52.

Figure 3:
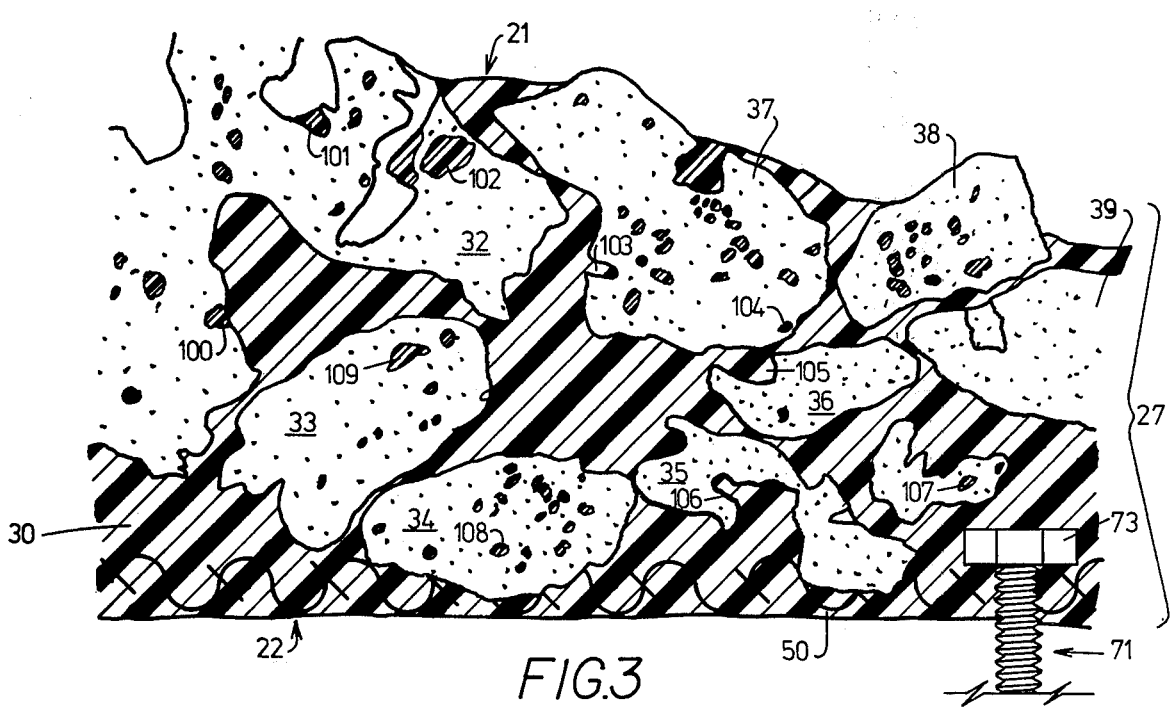
FIG. 3 is a diagrammatic scale view of the macrophotograph of FIG. 6.
Figure 5:
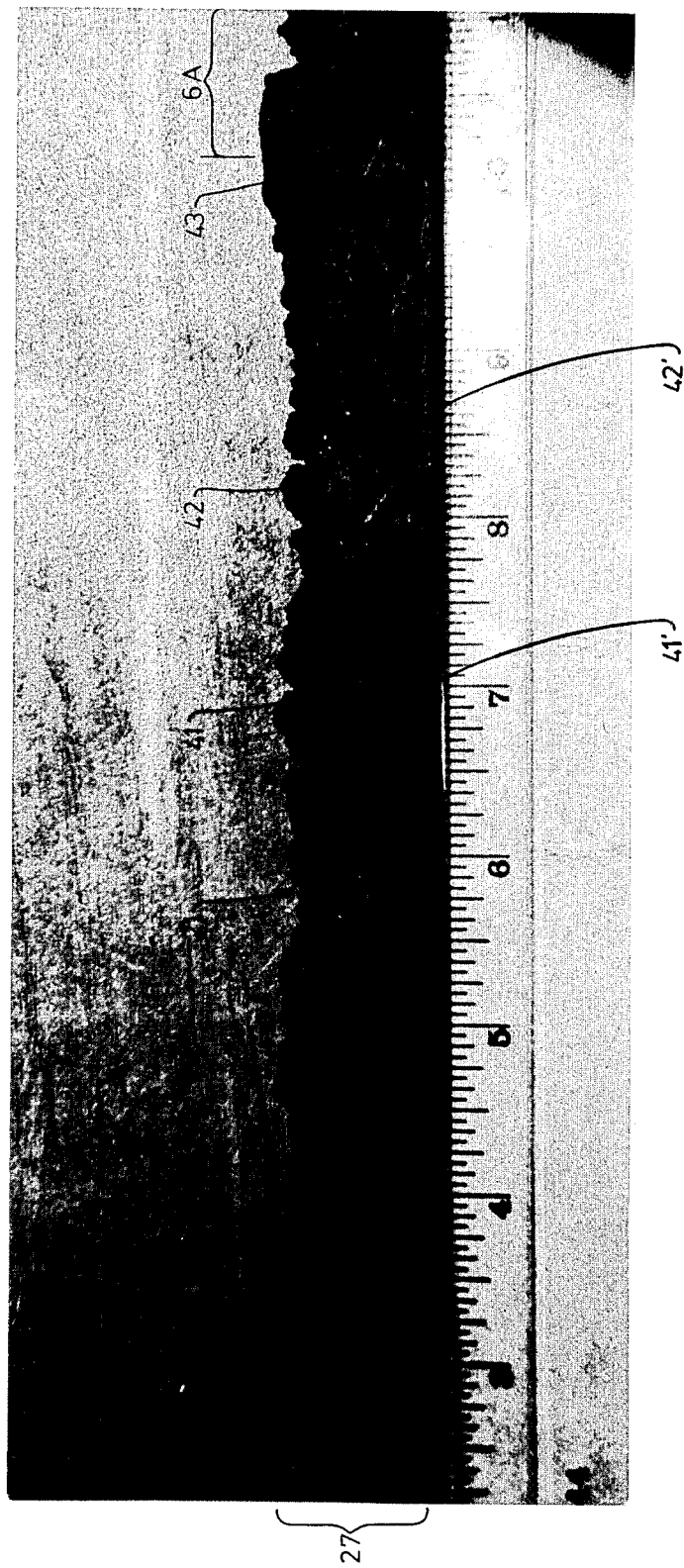
Figure 6:
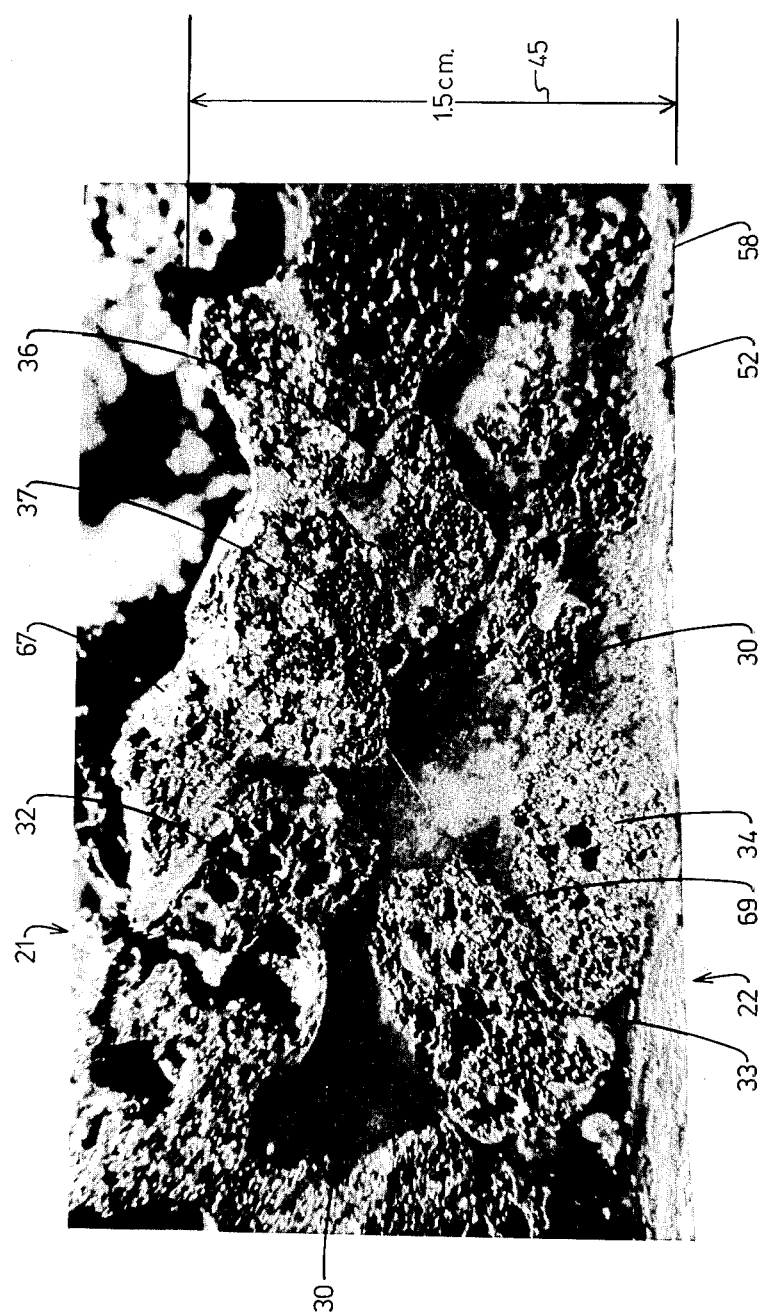
Figure 7:
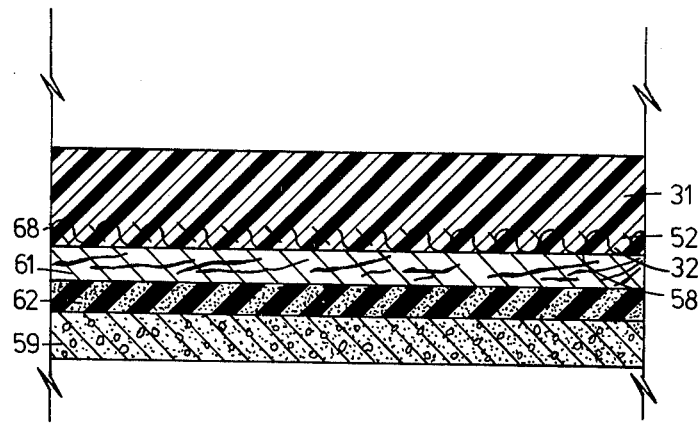
FIG. 7 diagrammatically shows a first stage in the process of formation of the panel of this invention.
Figure 8:
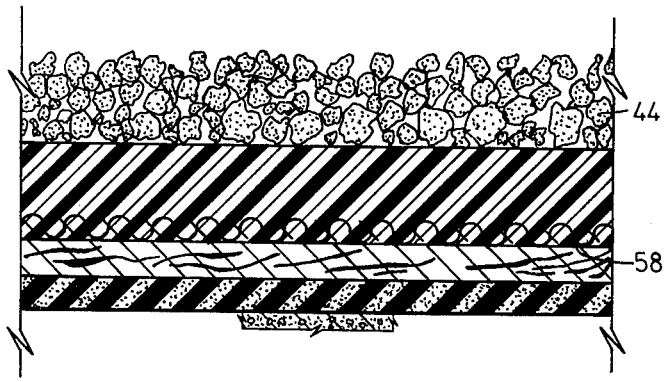
FIG. 8 diagrammatically shows a subsequent stage in the process of manufacture of that panel.
Figure 9:
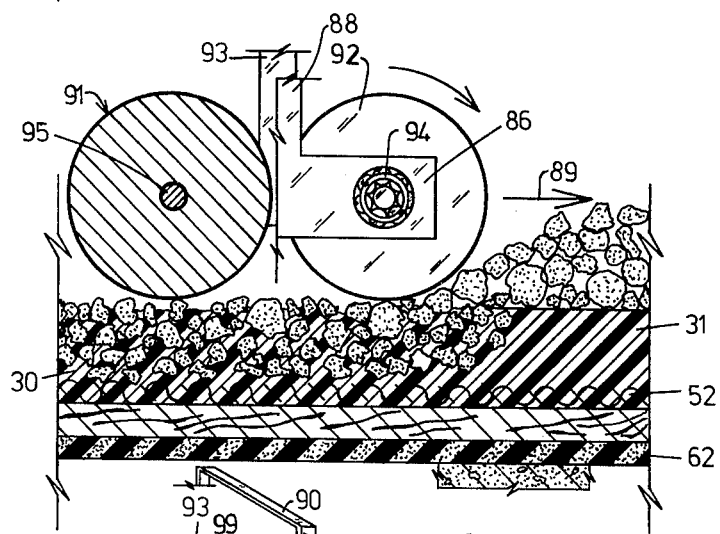
FIG. 9 diagrammatically shows the treatment of the materials shown in FIG. 8 in a stage subsequent to that shown in FIG. 8.

Generally the mass 27 is formed from an initial fluid resin layer as 31 of substantially uniform thickness: prior to the hardening of layer 31 an initial layer 44 of particles as 32-43 are added to the top of such layer 31; then such particles are, generally as shown in FIG. 9, forced into the resin layer while the layer 31 is still in a liquid condition. This operation is carried on in an open topped and flat bottomed container 60 in such manner, below described in detail, so that the irregularly shaped particles contact each neighboring particle and extend from top to bottom of the mass 27 generally as shown in FIGS. 3, 5, and 6; thus, as shown in FIG. 5 the particles 41' and 42' adjacent to the portion of the ruler in FIG. 7 (at points shown as 7" and at 8⅜ inches on the ruler) intrude into the lower fiberglass layer 52. Accordingly the particles are initially located in contact with each neighboring vesicular rock particle. The particles as 32-43 are sufficiently firmly compressed so that such particles form a substantially incompressible mass from top to bottom. The sectional views pass through some portions of the particular particles, as 36 which are more distantly spaced from its neighboring particles as 35 and 37 that are those portions of the same particles as 35 and 36 which are in direct contact with each other as shown in FIG. 3.

The complete panel 20 may be attached to the framework of a building 70 by bolts as 71 which pass through studs as 72 of the framework 70 and such bolts have bolt heads 73 which are firmly located in the mass 27 while the shaft 74 of the bolt 71 passes through the stud as 72.

Figure 2:
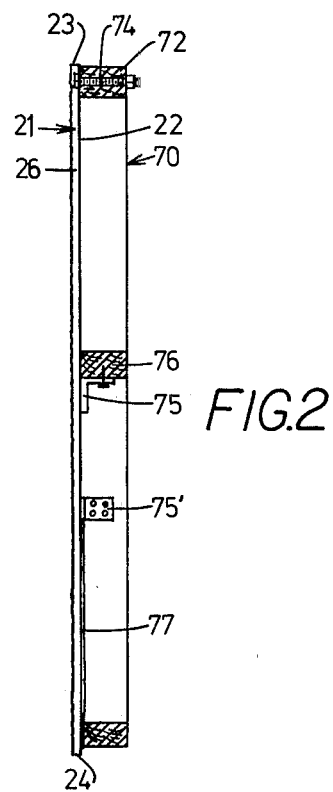
FIG. 2 is a sectional view diagrammatically showing the panel operatively installed on and connected to the frame of a building.

Steel straps such as 75 and 75' may be attached to the rear surface 22 of the panel 20 as shown in FIG. 2 and such straps nailed to the framework cross pieces as 76 or to the vertical studs as 72 as shown in FIG. 2. Additionally an adhesive layer as 77 may be applied to the outer surface of the vertical stud as 72 and such adhesive bonding of the stud to the rear surface 22 of the panel as 20 provides for firm and permanent attachment of the panel and the frame to each other. Such bonding agent may be one like epoxy which is self-hardening and the wood of the frame bonds firmly to the panel 20 and is strengthened thereby.

The porous rocks are generally known as scoria, a rough vesicular cinder-like lava, such as developed by expansion of enclosed gases in a basaltic magma.

The texture of such rock particles, as shown particularly in FIG. 6, is dense, (i.e. the constituents are too small to be seem without the microscope) and even-grained (i.e., of generally the same order of magnitude for the constituents); it is a vesicular structure and comprises a substantial portion—20-40%—of glass. Chemically, the particles are material composed of highly vesicular rhyolitic pitchstone containing silica and alumina as the major constituents (80+%) and minor portions of iron oxide, magnesia, lime, soda, potassium and water. The fusion temperature of this is so high that a propane torch flame does not affect it for 10 minutes. The rock particles' chemical composition is given in Table I. The rock particles as 32-43 have a hardness between 5 and 6 (Moh); (i.e. hard enough to scratch a knife blade) and have a bulk density of 51.8 to 55.6 pounds per cubic foot (including voids); as shown in the photograph, the particles are highly vesicular. The size of these holes varies; the average diameter of the vesicular holes varies from 0.2 to 0.4 millimeters with many being of still smaller size and a minor but important fraction thereof of a size larger than 0.5 millimeter in diameter. Such structure as shown in FIG. 6 of particle components and relations is a part of the disclosure of structure in this application. In the final form of arrangement of the rock-like forms and the plastic the finer holes in the rock particles provide an insulating structure while the larger holes provide for attachment of those rock particles to the plastic mass, as the plastic mass intrudes and extends into the larger holes and serves to anchor the masses around such holes to the plastic mass. The intrusion of the plastic mass into the holes is shown in FIGS. 3 and 6 where finger-like portions of the mass of plastic, as shown as at 100-109, intrude into the larger orifices of of the adjacent rock particle as 35-36, which orifices open to the surface of the rock particles.

In its initial liquid state the plastic components of which the mass 27 is formed are not sufficiently fluid or adhesive to the surface of the rock particles to enter into the smaller holes thereof. Accordingly, the smaller holes remain empty; however, the fluidity of the plastic and the force applied thereto are adequate in combination to force plastic selectively into the larger holes and provide resultant improved strength to the entire mass. While the particular plastic and resin used is not frequently used as a casting resin because of its shrinkage during its solidification in this particular process and procedure the shrinkage during solidifying is utilized to provide the result that the particles are engaged by the plastic intrusions into the orifices or vesicules and the neighboring rocks as 36 and 37 are accordingly held together by the prestressed tensioned connecting plastic material therebetween. In this regard the macrophotograph FIG. 6 shows at 69 some slight separation of the plastic mass and the surface of particles adjacent thereto to illustrate that the holding together of the plastic mass and the rock is achieved not by adhesion of the plastic to the surface of the vesicular masses but rather by entry of portions of the plastic mass into the peripherally open vesicules of the vesicular mass and engagement therewith; thereby, on solidifying of the resin mass the particulate solids as 32-39 which had been theretofore merely pressed together by the rollers as 91 and 92 as below described in relation to the process steps of FIG. 9 are drawn even more firmly together.

The glassy smooth exterior surface of the rock portions as 67 provide a reflective surface with a resulting reflection of radiation from a hot sun. The hardness of the surface is sufficiently great (5.5-6.0) that wear as would normally affect a softly pigmented surface does not affect such glassy material inasmuch as soft dusts do not affect the hard surface provided by the particles herein; the hardness is a substantial one between 5 and 6 on the Moh scale.

The action whereby the particles are held is sufficiently forceful so that only a minor portion of any particle as 40 need be actually within the outline of the mass, i.e. many particles as 40-43 have only a small portion of the surface thereof in engagement with the plastic mass but the engagement of the fingers of the plastic mass with such particles provide adequate strength to hold such particles in place in the upper layer generally as shown for large particles 42 and 43.

The temperature of curing of the resin is at room temperature and uses a conventional catalyst, also known as polymerization initiators, such as methyl ethyl ketone peroxide or cobalt napthenate. According to the concentration of the catalyst or accelerator the resin will gell at any time from 5 minutes to several hours. Gellation and an exothermic reaction are followed by hardening, and the resin becomes rigid and maximum mechanical hardening is obtained in about a week; the volumetric shrinkage for which the polyester resin described herein is used for casting purposes is a benefit as above described and for this purpose other resins having the same volumetric shrinkage characteristic on hardening may also be used.

To form the panel 20 a forming container or mold 60 is used. The container 60 comprises an imperforate rigid flat bottom wall 61 formed of plywood ¾ inch thick and vertical rigid parallel imperforate side walls 63 and 64 are straight vertically extending imperforate parallel end walls 65 and 66 extending transversely to walls 63 and 64 are forming a liquid-tight upwardly open container compartment. A ½ inch thick foam rubber layer 62 of uniform thickness and resiliency is firmly attached to the bottom of wall 61. In operation the layer 62 rests on a firm concrete floor 59.

Figure 10:
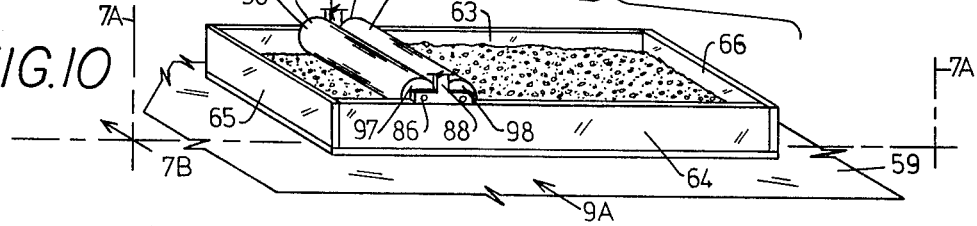
FIG. 10 is an overall perspective diagrammatic view of an apparatus for performing the steps shown in process of FIGS. 7-9.

In the process of operation according to this invention, firstly a small volume of liquid resin 30 which is uncured but to which initiator has been added for gelling in 30 minutes is added to the container 60 to form a thin yet complete layer over the interior surface 68 (forming the floor or bottom wall 61 of the forming container or mold 60) to a depth of 1/32 to 1/16 inch. This thin layer of liquid plastic is adequate to cover the lower or exterior surface 58 of fiberglass layer 52 subsequently added thereto. Then a 1/16 inch thick layer of fiberglass roving or mesh layer 52 is added on top of the thin layer of liquid resin theretofore added to the bottom of the box 60. A second thick layer of uncured plastic mass 31 containing initiator set for gelling in about 30 minutes and still in the liquid state is then applied over the roving or mesh 52 to a thickness of $\frac{3}{4}$ of the intended desired final average thickness of the finished panel; for this purpose about $\frac{1}{2}$ gallon per square foot of panel is added to container 60. This corresponds to four gallons of resin for a two foot wide eight feet length as shown in FIG. 10, (or eight feet high as shown in FIG. 1) and corresponds to a weight of panel of $63\frac{1}{2}$ pounds ($\pm 0.5$ lb). The setting time of the resin is arranged for a 30 minute time for setting. This setting time is conventional as above described depending on the amount and type of initiator used. This 30 minute gelling time is adequate to provide for the incorporation of the rock particles as 44 in the plastic layer as 31 as described above in a uniform manner and does not result in hardening of one portion of the layer 31 at a time sufficiently prior to the hardening of the other portions thereof as would provide a difference in structural characteristics of the finished product. After the addition of the liquid resin layer 31 on top of the fiberglass to a uniform thickness throughout a layer of loose rock 44 of substantially even depth or thickness composed of particles as above described are evenly distributed as a layer of uniform thickness on top of the layer of resin and completely and uniformly cover that layer. The volume of this layer 44 is the same volume amount as the volume of resin, namely four gallons of the rock particles for 16 square feet of panel of $\frac{1}{4}$ gallon per square foot of the finished panel.

The bulk density of the rock is 1400–1500 pounds per cubic yard which corresponds to a bulk weight of 6.93 pounds per gallon. In view of the void space between the rock particles in the mass 44, the actual density of each of the particles in mass 44 is 69.3 pounds per cubic foot and/or a specific gravity of 1.1.

Rollers 91 and 92 are rotatably supported on axles 95 and 94 respectively. The axles 95 and 94 are rotatably located in rigid side frames as 88 and 87. The like roller side frames 93 and 88 are firmly joined by an upwardly located rigid U-shaped harness 90. The vertical edges 96 and 97 of rollers 91 and like edges 98 and 99 of roller 92 are interior of and adjacent to the walls 63 and 64 of container 60.

The horizontally extending rigid arms as 86 extend horizontally and rest on the top edge of side walls as 63 and 64 and provide for longitudinally slidably supporting the rollers 91 and 92 so that in the action illustrated in FIG. 9 this structure provides for an even minimum thickness of the finished panel 20 while also allowing for some relief of the roller position by an increase of height of the rollers to accommodate for larger rocks as 42 and 43 on the panel surface. The use of two rollers each about 3 inches radius and weighing a total of 15 pounds for the two provide that an operator may thereby move the rollers 91 and 92 for an eight foot length in about 20 seconds while the rollers as shown in FIG. 9 and above described evenly distribute the rock particles of layer 44 in and over the mass 31. The rollers are moved by movement of the U-shaped harness 90 or by machine. Harness 90 is shown broken away for clarity in FIG. 10.

The above data for an 8 foot long and 2 foot wide mold are only exemplary, as 9 foot long panels and panels of 2, 3, or 4 feet width are correspondingly provided for panels of corresponding size.

Figure 4:
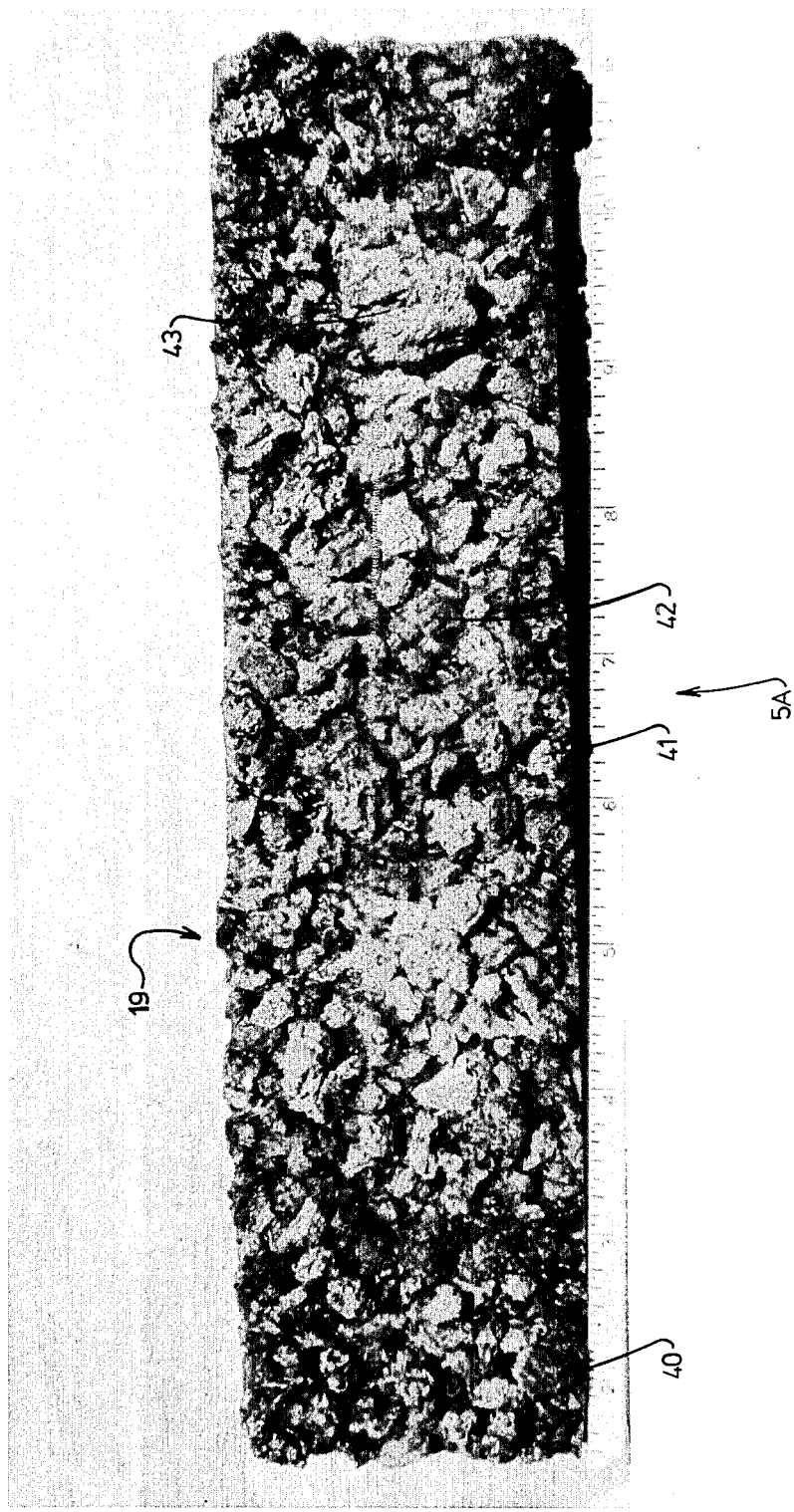

The sponge rubber layer 62 at the bottom of the wooden floor panel 61 limits the pressure applied by the rollers as 91 and 92 to the rock so that only such an amount as of pressure will be applied to such particles as will provide selective intrusion into the larger vesicular orifices but not sufficient to cause intrusion of the liquid plastic into the smaller orifices of the vesicular rock particles, as 32–42. As shown in FIGS. 4–6) the rock particles in the upper layer (as shown in FIGS. 4–6) completely cover the resin therebelow and prevents action thereon by ultraviolet light by a shield-like action thereon so that the resin does not become weakened by the action of sunlight (because of the complete coverage of the rock). The small diameter closed vesicular structure of the rock provides a rather startling insulation characteristic with the temperature on the outside of the panel being at 112° F. the zone therebelow, without ventilation stays, after a period of 8 hours, at only 96° F.

The strength of the material of which the panel 20 is formed is shown by that a horizontally extending four foot long and two foot wide test panel having an average thickness of $\frac{1}{2}$ inch and maximum thickness of $1\frac{1}{8}$ inches and minimum thickness of 5/16 inch, which panel is formed of rock particles as 32–43 and resin as above described and which panel is positioned with its edges horizontal and its rough surface as 21 facing upward and with mechanical supports provided at the two feet long edges of that test panel and which support is provided by a conventional two inch by four inch boards located with their outer edges adjacent to the outer edges of the panel so that a 41 inch span is provided between such supports, supports a load of 170 pounds directed perpendicular to the upper face and located half way between the four foot edges and two foot edges of that test panel;—such load provides a vertical deflection of only $\frac{7}{8}$ inch while a load of 360 pounds provided at the same point and in the same direction provides a vertical deflection of only $1\frac{3}{4}$ inch. Further, these deflections are elastic with the test panel returning to its original shape after removal of such loads. The breaking load similarly tested at a 36 inch span between panel supports is 600 lbs., with such load applied by a rigid 2.5 inch diameter steel roller parallel to the 2 foot long edge of the test panel. This test of the strength of the test panel provides a deflection of 10 inches at the point of application of load before rupture of the test panel.

The amount of inter-particle void space depends upon the shape and size range of particles used; for the particular range of equi-axed material used (all over $\frac{1}{4}$ inch diameter, all under $1\frac{1}{4}$ inch diameter) as shown in FIGS. 3–6, the inter-particle void volume is about 40% of the bulk volume of the particle layer 44. Of the intraparticle vesicular space available, only a minor portion—about 30%—as shown in FIG. 6 is occupied by the elongated plastic masses that engage with the larger vesicules or holes the rock particles.

Generally the panels as 20 have an average thickness of about ½ inch (±1/16) with a minimum thickness of 5/16 inch and a maximum thickness of 1-1/18 inches where particularly large rocks are attached to the surface. That attachment of larger rocks to the surface provides an exterior appearance of great natural beauty because of the colors involved. The colors of these rocks range from red, brown, black, purple, and yellow but dominantly warm colors such as reds, yellows, and browns, which shine very brightly in the sunshine.

Inasmuch as a panel such as 20, eight feet high and two feet wide and about ½ average thickness as above described weighs only about 63 pounds it may be readily handled by an operator as 28 as shown in FIG. 1 and moved from a stock pile thereof to installation without the use of special machinery and thereby to quickly cover an eight foot by two foot area with an insulating, wear-resistant, strong, hard, surfaced temperature-resistant surface that is tough and elastic. Panel 20 provides the combination of hard, wear-resistant material (provided by the surface of the rock particles as 32–43 used herein) as well as insulation characteristics (provided by the small vesicules of the rocks) while, by the same structure, because of the method of connection of the rock-like particles through the resilent resin, a tough and elastic as well as waterproof structure is provided for its ready and economic installation due to light weight of such panel.

Approximate composition of rock particles above discussed are set out in Table I below.

The polyester resin 30 used is described at pages 331-343 of *Plastics Materials* by J. A. Brydson, published 1966 by D. Van Nostrand Company, Princeton, N.J. The thickness of the panel 20 above discussed and described is exemplary; other thicknesses are within the scope of this invention as well as other sizes, as above discussed.

TABLE I:

INSERT A:
APPROXIMATE COMPOSITION OF ROCK PARTICLES

| Constituent | Percentage | Range |
|---|---|---|
| $SiO_2$ | 71 | 65–75% |
| $Al_2O_3$ | 13 | 12–15% |
| $Fe_2O_3$ | .7 | .2–2.0% |
| FeO | .5 | .3–1.3 |
| MgO | .2 | .1–.3 |
| CaO | .7 | .7–.8 |
| $Na_2O$ | 3.8 | 3.8–4.0 |
| $K_2O$ | 4.1 | 4.1–4.6 |
| $H_2O$ | 2.4 | .4–5.5 |

I claim:

1. A building panel comprising essentially, when completed, a main body mass consisting of a substantially rigid polyester resin in sheet form having molded therein a plurality of closely compacted porous scoria rock particles of varied size in range of ¼ to 1¼ inch diameter size and each comprising vesicules of varied size in range of 0.1 to 0.5 millimeters diameter that occupy the major portion of the volume of each such particle, such particles being compacted to form a substantially imcompressible mass, said polyester resin being of substantial tensile strength and extending between the rock particles and including fingerlike intrusions extending into the larger vesicules of the rock particles and holding the rock particles together, said compacted rock particles substantially filling the entire volume of the main body mass, and including rock portions extending beyond the volume occupied by such polyester resin mass.

2. An article as in claim 1 wherein the rock particles have a hardness in excess of 5.0 on the Moh scale.

3. An article as in claim 2 wherein said rock particles extend beyond the resin surface at one side thereof and a fiberglass layer is incorporated in the resin surface on the opposite side thereof.

4. An article as in claim 3 wherein the smaller vesicules in said rock particles are empty and the major portion of the volume of vesicules in the particles are empty and the rock particles on said one side of said panel support vesicules at a distance from said polyester resin mass.

5. An article as in claim 4 wherein said polyester resin between said particles is under tension.

6. A building panel as defined in claim 1 wherein the polyester is initially liquid and shrinks on solidifying.

7. A building panel as defined in claim 1 wherein the rock particles extend beyond the boundaries of the resin mass and serve to provide a hard, heat and radiation resistant shield that protects the resin below.

8. The building panel as defined in claim 1 wherein the vesicules in the rock particles provide insulation.

9. A molded composite building panel in sheet from consisting essentially of:
   (a) a mass of closely compacted, rigid, hard porous scoria rock particles; and
   (b) a resinous sheet-like mass of rigid polyester resin binder having substantial tensile strength throughout the resinous mass in which said rock particles are embedded,
   said mass of rock particles substantially filling the entire volume of the resinous mass, and including particles projecting outwardly beyond the surface of the sheet-like resinous mass, a portion of the polyester resin extending into the pores of the rock particles and serving to bind the rock particles together.

10. The molded composite building panel as defined in claim 9 wherein a fiberglass layer is incorporated in the resinous mass on the opposite side from the outwardly projecting rock particles.

* * * * *